United States Patent
Anderson et al.

(10) Patent No.: US 7,904,510 B2
(45) Date of Patent: Mar. 8, 2011

(54) SYSTEMS AND METHODS FOR MANAGING DISCUSSION THREADS BASED ON RATINGS

(75) Inventors: Stephen Anderson, Redmond, WA (US); Ridge Ostling, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1141 days.

(21) Appl. No.: 10/784,691

(22) Filed: Feb. 23, 2004

(65) Prior Publication Data
US 2005/0198128 A1    Sep. 8, 2005

(51) Int. Cl.
G06F 15/16    (2006.01)
G06F 7/00    (2006.01)

(52) U.S. Cl. ......... 709/204; 709/206; 709/207; 707/662; 707/663; 707/667

(58) Field of Classification Search .......... 709/204–207; 707/10, 204, 206, 661–663, 667–670; 715/753, 715/758; 705/10
See application file for complete search history.

(56) References Cited

U.S. PATENT DOCUMENTS

| | | | | |
|---|---|---|---|---|
| 5,724,567 A * | 3/1998 | Rose et al. | ...................... | 707/2 |
| 5,826,022 A * | 10/1998 | Nielsen | ...................... | 709/206 |
| 6,362,837 B1 * | 3/2002 | Ginn | ...................... | 715/751 |
| 6,442,600 B1 * | 8/2002 | Anderson | ...................... | 709/217 |
| 6,493,703 B1 * | 12/2002 | Knight et al. | ...................... | 707/999.004 |
| 6,578,025 B1 * | 6/2003 | Pollack et al. | ...................... | 707/999.002 |
| 6,665,655 B1 * | 12/2003 | Warner et al. | ...................... | 707/999.002 |
| 6,757,713 B1 * | 6/2004 | Ogilvie et al. | ...................... | 709/206 |
| 6,807,566 B1 * | 10/2004 | Bates et al. | ...................... | 709/206 |
| 6,816,884 B1 * | 11/2004 | Summers | ...................... | 709/206 |
| 6,826,596 B1 * | 11/2004 | Suzuki | ...................... | 709/206 |
| 7,143,135 B2 * | 11/2006 | Smith et al. | ...................... | 709/204 |
| 7,200,606 B2 * | 4/2007 | Elkan | ...................... | 707/102 |
| 7,305,436 B2 * | 12/2007 | Willis | ...................... | 709/204 |
| 7,328,242 B1 * | 2/2008 | McCarthy et al. | ...................... | 709/204 |
| 7,543,053 B2 * | 6/2009 | Goodman et al. | ...................... | 709/224 |

(Continued)

FOREIGN PATENT DOCUMENTS

JP    2002-140602    5/2002

(Continued)

OTHER PUBLICATIONS

European Communication dated Feb. 13, 2009 cited in European Application No. 05 100 946.2-1238.

(Continued)

*Primary Examiner* — Ario Etienne
*Assistant Examiner* — Gregory G Todd
(74) *Attorney, Agent, or Firm* — Merchant & Gould

(57) ABSTRACT

System and method for removing threads from discussion groups based on ratings of the individual posts within the thread. If a user takes the time to rate a post positively, then the post (and the thread) is considered to be useful to the entire community and should not be deleted. To rate the post, a window is displayed to the user whenever the post is open and queries the user whether the post is useful. A positive rating resets a delete date associated with the post. If there is not positive rating of a post, the thread may be considered useful if the originator of a post marks the post as being answered, in which case delete clock is reset. If however, none of the posts within the thread are rated positively, then the thread is considered not be useful and deleted.

16 Claims, 5 Drawing Sheets

U.S. PATENT DOCUMENTS

| | | | |
|---|---|---|---|
| 7,640,305 B1 * | 12/2009 | Arthur et al. | 709/206 |
| 2002/0078152 A1 * | 6/2002 | Boone | 709/204 |
| 2003/0126136 A1 * | 7/2003 | Omoigui | 707/10 |

FOREIGN PATENT DOCUMENTS

| | | |
|---|---|---|
| JP | 2003-263387 | 9/2003 |

OTHER PUBLICATIONS

Chinese First Office Action dated Apr. 2, 2010 cited in Application No. 200510052597.5.

Japanese Notice of Rejection dated Sep. 24, 2010 cited in Application No. 2005-047642.

* cited by examiner

SYSTEMS AND METHODS FOR MANAGING DISCUSSION THREADS BASED ON RATINGS

TECHNICAL FIELD

The present invention is directed to discussion groups and more particularly to a method for removing threads from discussion groups.

BACKGROUND OF THE INVENTION

The Internet has evolved into having two main functions: facilitating communications and dispersing information. One source for both facilitating communications and dispersing information are discussion groups. Discussion groups are basically a continuous public discussion related to a particular topic. Users can log onto a particular discussion group and post a message or a question to the discussion board. Discussion groups are very effective when users want to participate in a detailed discussion about a particular topic. Typically, the discussion groups are started by an author or entity that has an interest in a particular topic or is seeking answers to questions related to the particular topic. Within each discussion group, there may be multiple threads, which are a hierarchical listing of multiple posts related to the same subject and also archive the conversation among users about that subject. Posts within each thread usually share subject lines as well as the notion of different types of threads, e.g. right now, question and answer, or general discussion. Normally, a user, also known as a poster, places a post to begin a thread. Other posters then may reply to the post. These replies constitute the thread of the discussion.

Users may log into the discussion group and either read the post within a thread or add a new post to a given thread. Although discussion groups have become quite popular, their popularity has lead to several concerns. First, because threads within the discussion groups can become quit large, they require a large amount of storage space within the server. Because the discussion boards are typically maintained on a single server, usually by the author who originated the forum or discussion group, the cost of storing the threads can become quite large. Additionally, because threads may be searched for a particular reply, the cost associated with searching a large number of unimportant threads becomes expensive both in time and money.

A second concern is that that some threads are of no use to users. These threads remain on the server and needlessly consume precious system resources. Additionally, even threads that originally were once useful, may become obsolete, because the topic of the discussion group has become obsolete or because an upgrade or a patch to the software product has become available that solved the problem that was the focus of the discussion. These obsolete threads then occupy resources on the server, thereby increasing the costs associated with hosting it. Still another concern for discussion groups is unsolicited advertisements. These unsolicited advertisements provide no useful information to the discussion thread, occupy valuable system resources, and generally annoy intended users.

One method to deal with these concerns is to delete individual posts within threads that are older than a predetermined date. Typically, the server hosting the discussion board will delete "old" posts from the system. Normally, the server examines each post to determine its age by looking at the post date. If the post date exceeds a threshold number of days, such as ninety days, then the post or message is eliminated. Although deleting individual posts based on a first-in-first-out (FIFO) approach reduces the overall number of posts stored in the discussion board, several problems result from this method. First, deleting old posts fragments the threads and destroys the continuity of the thread. For example, if the original post and earlier replies are deleted from the discussion board, users accessing the thread will not see the initial question or comment and the initial replies, which may contain valuable information. Additionally, the remaining posts may become meaningless to users, as users will not know in what context the post were created. Another problem is that because posts are deleted based on a FIFO approach, potentially useful posts may be deleted, thereby erasing potentially important information, while at the same time possibly leaving useless posts intact.

Another solution to deal with the cost of storing discussion threads is to delete the entire thread if the earliest post within the thread exceeds a predetermined number of days. Thus, instead of only deleting those individual posts within a given thread, the entire thread is deleted. Although deleting the entire thread alleviates the problem of fragmenting threads, potentially useful threads may be deleted simply because they have exceed an arbitrary threshold time limit, while potentially useless threads remain on the server because they have not aged past the predetermined time limit.

Therefore, there is a continuing need for a method for monitoring a discussion group in an automated manner. In particular, there is a need for a method for removing useless and unused threads from a discussion string while maintaining useful threads within the discussion group, regardless of their age.

SUMMARY OF THE INVENTION

The present invention meets the needs described above in a method and system for removing threads from a discussion group based on rating given to the individual posts within the thread. Generally described, the invention includes a method for removing threads from a discussion group based on the ratings of the individual posts supplied by the users. Upon opening a post within a thread, a date to delete the thread is initially set to a predetermined value. Whenever a user reads a post within the thread, a window is displayed asking the user to rate the usefulness of the post. If at least one user rates at least one post in the thread as being useful, then the delete date is reset. However, if no user has selected at least one post as being useful, the delete date is left unchanged. Next, the delete dates of the thread is examined to determine whether the delete date is the same as the current date of the system clock of the server hosting the discussion group. If the delete date of the thread is the same as the current date system clock, the entire thread is deleted from the discussion group.

The method may also determine whether the rating field has a value indicative of being useful by first determining whether at least one user opened a post within the thread. Next, a rating field associated with the thread is examined to determine whether the user has affirmatively rated at least post within the thread as being useful. If the user rated at least one post as being useful by placing an affirmative answer in the rating field, then the delete date is reset. However, if the user opened the post but did not rate the post, the post is still considered useful, as the non-response of the user is considered to be an implicit affirmative response.

The method resets the delete date by first examining the thread type. If the thread is determined to be a first type, such as a General Comment-type, the delete date is set to a first predetermined date. However, if the thread is categorized as a second thread type, which may be either a Question/Answer-type thread or a Feedback-type thread, then the deleted date is set to a second predetermined date, wherein the first predetermined date is less than the second predetermined date. This is due to the fact that threads that fall within the second type are considered to be more useful than those threads that fall within the first type and are retained for a greater period of time on the discussion board on the server.

The various aspects of the present invention may be more clearly understood and appreciated from a review of the following detailed description of the disclosed embodiments and by reference to the appended drawings and claims.

DETAILED DESCRIPTION OF THE INVENTION

The present invention is typically embodied in a routine to determine whether a given thread in a discussion group should be removed from the discussion group. The routine allows a user to rate the usefulness of each post within a given thread.

Figure 1:
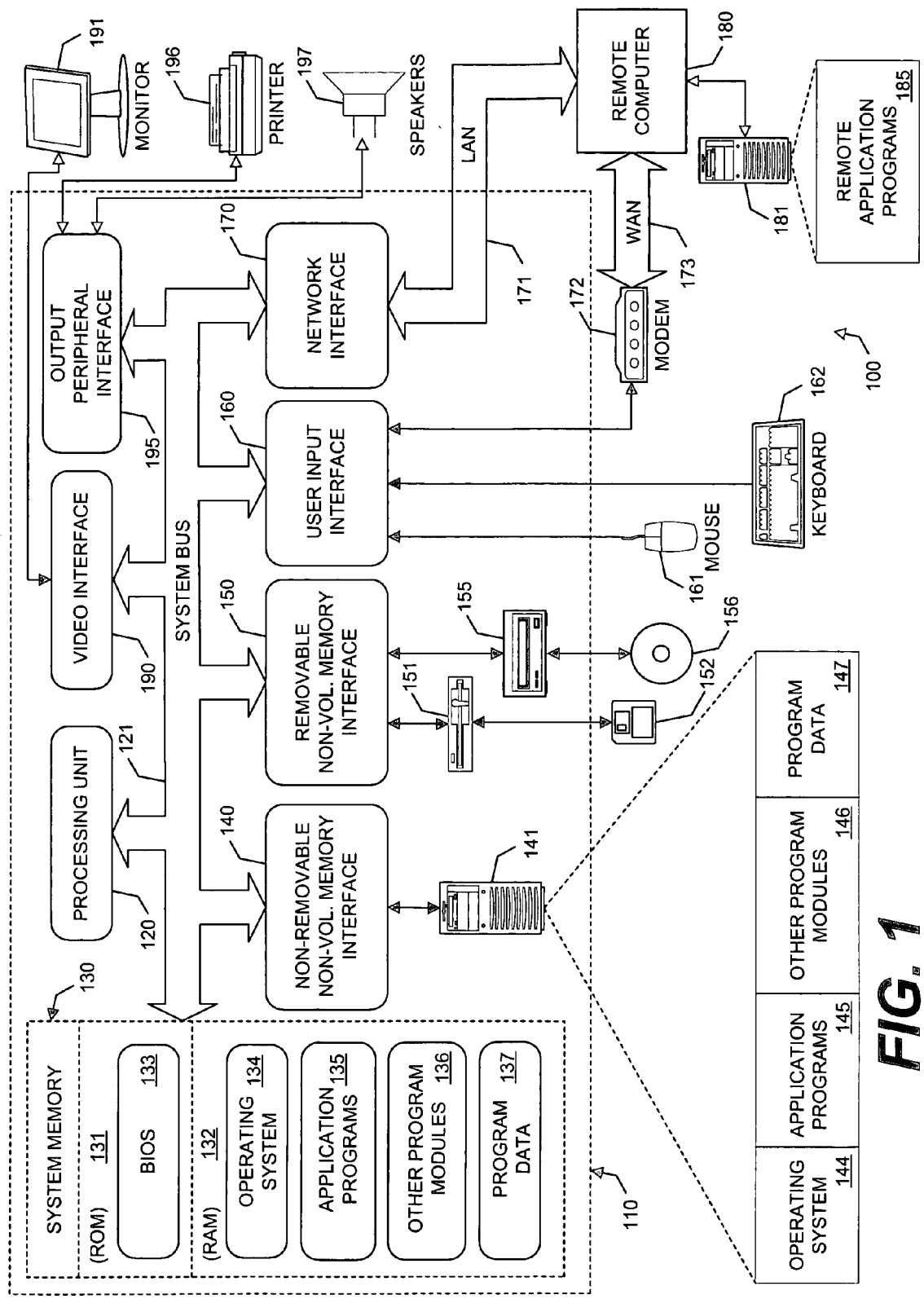
FIG. 1 is a block diagram illustrating a computer that provides the operating environment in accordance with some embodiments of the present invention.

Turning now to the figures, in which like numerals refer to like elements through the several figures, FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronTD, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video ElectronTD Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules, or other data in a modulated data signal such as a carrier wave or other transport mechanism and includes any information delivery media. The term "modulated data signal" means a signal that has one or more of its characteristTD set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
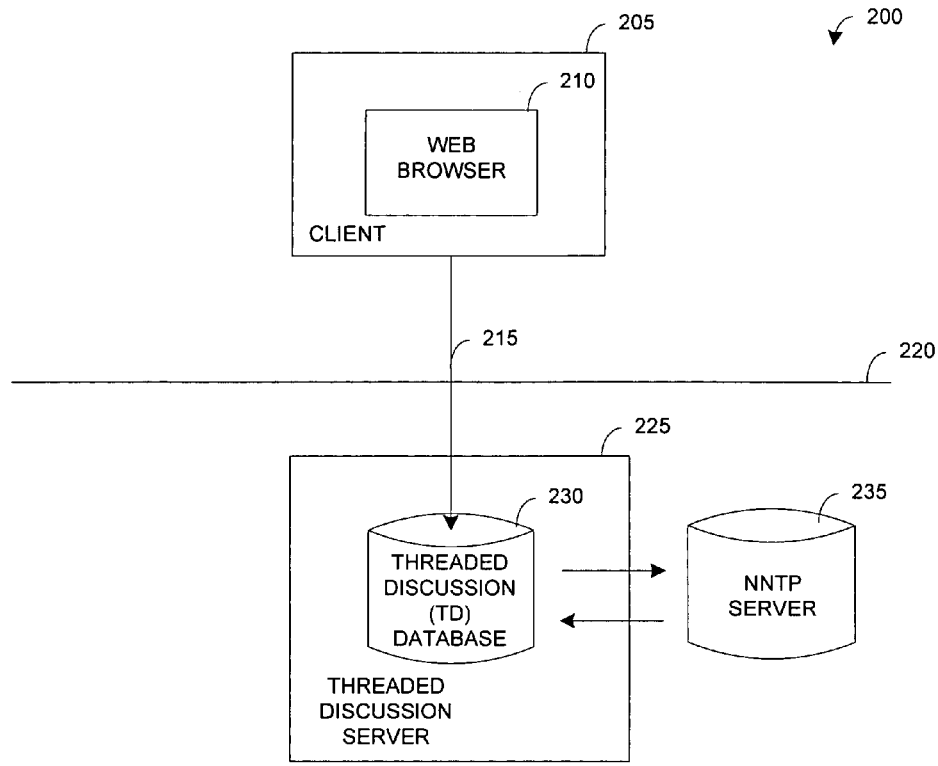
FIG. 2 is a block diagram illustrating a client-server system that provides the operating environment in accordance with some embodiments of the invention.

FIG. 2 is a block diagram illustrating a client server operating system 200 that provides an operating environment in accordance with some embodiments of the present invention. The client-server system 200 includes a client machine 205, which may be the personal computer 110, which individual users may use to access and place posts on discussion groups. Although the client 205 is depicted as a personal computer, those skilled in the art will appreciate that the client 205 is not limited to a personal computer and may be a server, personal digital assistant (PDA), a cellular telephone, Blackberry® device, or any other device that allows the user to access a distributed network.

The client 205 may also contain a web browser 210 application program, such as Internet Explorer™ manufactured by Microsoft Corporation of Redmond, Wash., that allows the user to access discussion groups on the Internet, or any other distributed network.

The client-server system 200 also includes a threaded discussion (TD) server 225. The TD server 225 may be in turn connected to a Network New Transfer Protocol (NNTP) server 235, which may host the particular discussion group. The TD server 225 can push and or pull any post to or from the NNTP server 235. Although the TD server 225 is depicted as being connected to a single NNTP server 235, those skilled in the art will appreciate that the TD server 225 may be connected to any number of NNTP servers 235. Also, the TD server 225 may stand alone and support the discussion group without being connected to any NNTP server 235. The TD server 225 may contain an integrated community store database 230 that stores each post associated with each thread in the discussion group. For example, when a user on the client 205 wants to place a post on the discussion board of a discussion group, the client 205 passes the post to the TD server 225, which stores the post and associated thread on the TD database 230. In this manner, the post and threads are stored twice, once on the NNTP server 235 and once on the TD server 225. This allows the threads to be stored on the TD server 225 based on how important the thread is determined to be rather than for an arbitrary time, as with the case of the NNTP server 235. For instance, posts are typically deleted from the NNTP server 235 after a period time has elapsed, such as ninety days. If a user wanted to see the a particular post more than ninety days after it had been posted, the user would be unable to view the message since it would have been deleted. However, by storing the threads on the TD server 225, the individual posts within the threads would still be available after the individual posts are removed from the NNTP server 235.

Upon creation of a new post, the user is asked to identify the type of post he or she is creating. For example, the post may be a Question-type post that the user wishes to pose to the community and receive an answer, or the post may be a General Comment-type post regarding the subject matter of the discussion group, which the poster believes may be of interest to the entire community, or the post may be a Reply-type post, in which the poster is responding to either a Question, or General Comment. Finally, the post may be a Feedback-type post, in which the user provides comments or suggestions to the host of the discussion group. This list of post types is not meant to be exhaustive and those skilled in the art will appreciate that other types of posts may be included without departing from the scope of this invention.

The type of post created by the user determines how long the post will be stored on the TD server 225, which is due to some post types being considered more important than other post types. For example, threads that contain posts that are either Answer or Feedback posts are considered to be more important since they typically contain information that may be beneficial for a longer period of time. Suppose a developer had a question concerning creating custom macros in Microsoft® Excel™ and posted a Question-type post on a discussion group dealing with creating macros in Microsoft® Excel™. If the thread containing the Question-type post also contains an Answer, it may likely be of interest to anyone who creates custom macros and therefore will likely be more valuable the entire community. Therefore, it is advantageous to keep the thread around longer. Similarly, Feedback-type posts may also be more important since they may contain information both about how to improve the product as well as responses from the producers of the product.

If the thread type is either a Question/Answer or a Feedback type, a delete date for the thread is set to a first value, which is typically the date that the last message was added or the last positive rating was received plus a predefined number of days, such as 120 days. However, if the post type is of a type other than a Question or Feedback type, such as a General Comment type post, then the delete date to delete the thread is set to a second value, that is less than the first value associated with the Question or Feedback type posts. For example, the first threshold value for a General Comment thread may be set at ninety (90) days. These threshold values are typically configurable and may be set by the administrator of the TD server 225. Whenever a user rates one of the posts within a given thread as being useful, the delete date of the thread is reset by adding the threshold value to the current date on the system clock of the TD server 225. Setting distinct threshold dates for threads that are assumed to hold information that is important to the discussion group community insures that threads are maintained on the TD server 225 for a greater length of time.

Once the user at the client 205 identifies the post type, the post type is placed in an TD database 230 on the TD server 225. Additional information supplied by the user associated with the post and may also be placed in the TD database 230. For example, each post may typically contains several fields that are used to track and identify the poster. For instance, each post may contain a field to identify the discussion group, as well as a field to identify the thread subject, a field for the email address of the poster, the date that the post was made, the text of the post itself and possibly the text of the antecedent posts if the post is a Reply. Some of these fields may be automatically filled through handshaking between the client 205 and the server 225 at the time the client 205 registers with the TD server 225, or may be manually entered by the user at the time the post is created. Additionally, a field passport identification (ID) may be used to identify the user during and is typically generated by the TD server 225.

After the information for the poster has been generate, other user within the discussion group may read the post. When a post is read, a window may appear on the display device proximate to the post which may contain a message to the user inquiring whether the user found the post or message useful. Normally, there may be two response buttons in the window for the user to select: a "YES" button and a "NO" button. Although the user interface for rating a post is described as using buttons, those skilled in the art will appreciate that other types of user interface mechanisms may be used for rating the individual posts with the threads without departing from the scope of the invention. The user is able to answer through selecting either the "YES" button if he or she determined that the message or post was useful, or the "NO" button if the user determined that the post or message was not useful. The answer is then passed from the client 205 to the TD server 225, where it is stored in the ratings field associated with the post in the TD database 230. Upon receipt of a positive rating, the TD server 225 will reset the delete date for the thread to the second date. The user also has the option not to reply to the text message. In this instance, when the user does not provide any feedback, the non-response of the user may be recorded as an implicit "YES" response by the user. This is due to the fact that it may be assumed that since the user took to the trouble to open and read the post, he or she must have thought that it was important and had some value. Similarly, if a user posted a replay to a particular post and failed to provide a rating for the post, the Reply post may be considered as an implicit "YES" response to the inquiry of whether the post is useful. Again, the assumption being that if the user took the time to reply to the message then the message must be useful.

After the user has posted a post or rated a post, the rating is stored with the post in the ratings field in the TD database 230 on the TD server 225. The TD server 225 then checks each post within each thread of the discussion group stored in the TD database 230 on a predetermined basis to determine how long the post has been saved and whether it has received a favorable rating. First, the ratings field in each post of each thread is checked to determine whether any of the posts received a favorable rating. If one of the posts received a favorable rating then the delete date is set to the current date on the system clock plus the predetermined threshold date value. For example, if a post in a question thread received a positive rating, then the delete date to delete the thread would be reset to the date of the system clock plus the threshold value for a Question-type post, which may be 180 days. The updated delete date is stored with the thread in the TD database 230. If the originator of the thread marked at least one post within the thread as "ANSWERED," it is assumed that the thread is useful, since the original question has been satisfactorily answered. Since an answer has been supplied, the thread is then upgraded to a Question/Answer-type thread, which is maintained for a longer period of time on the TD server 225. In this instance the thread's delete date is updated to the date of the system clock plus second number of threshold days for a Question/Answer thread. Thus, assuming the number of threshold days for a Question/Answer-type thread is 180 days, the delete date of the particular thread is reset to the current date plus 180 days.

The date associated with the original post within the thread is checked against the date of the system clock. If the date of the system clock is less than the delete date of the thread, the thread remains on the system. However, if the delete date is less than the date of the system clock, the thread is determined to be not important and the entire thread is deleted from the TD database 230. Thus in this manner, the threads are retained on the TD server 225 based on the whether users of the discussion group have determined that the thread is useful rather than deleted after an arbitrary number of days have elapsed since the thread was first started.

The client-sever system 200 may also include a firewall 220 to prevent any unauthorized access to or from the distributed network 215. The firewall 220 may be implemented in either hardware or software, or a combination of both. All messages entering or leaving the TD server 220 pass through the firewall 220, which may examine each message and may block any messages or portions of messages, such as attachments, that do not meet the specified security criteria.

Figure 3:
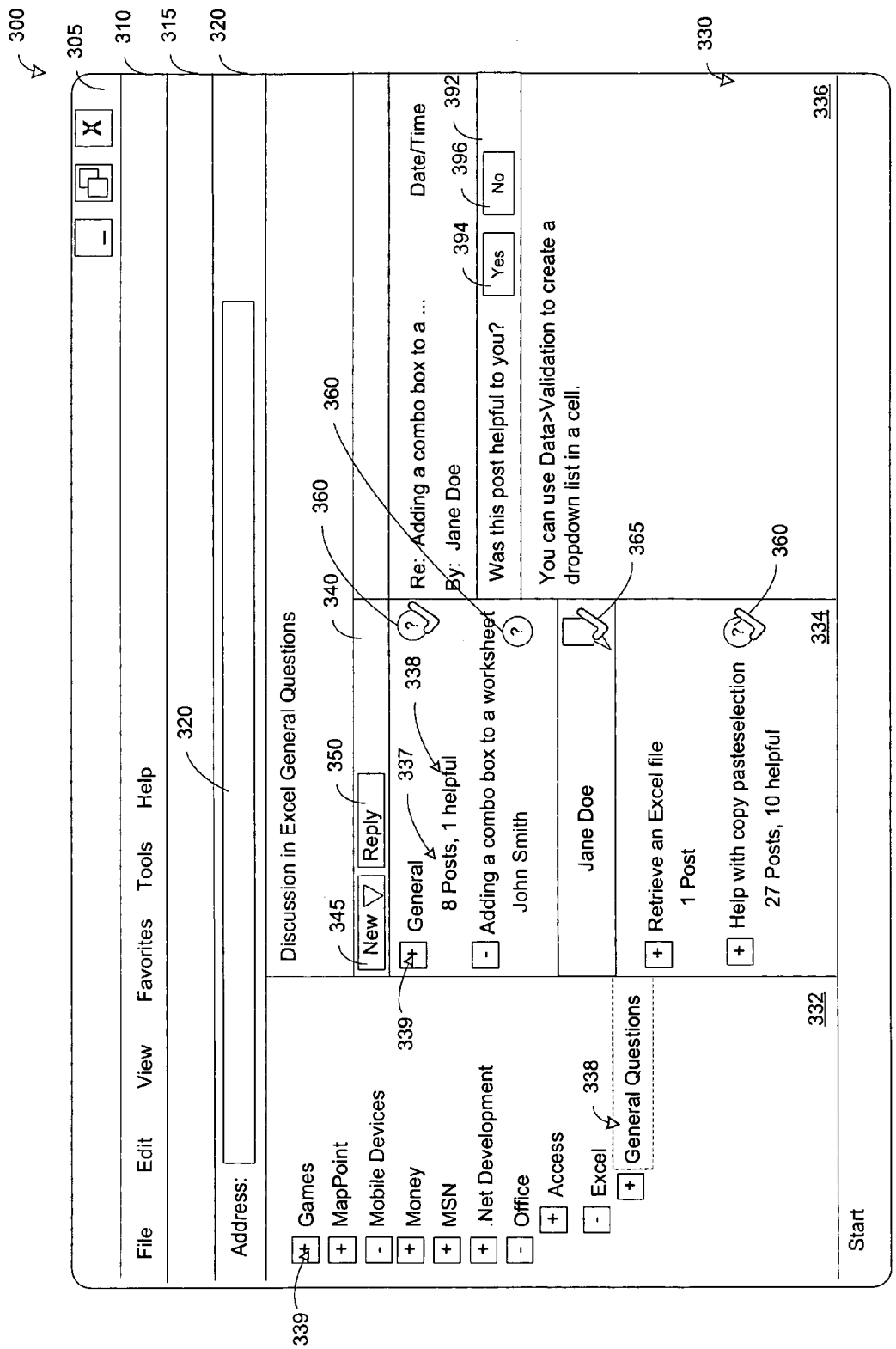
FIG. 3 is an illustration of a screen shot illustrating a method for rating a post in a discussion thread by a user in accordance with some embodiments of the present invention.

FIG. 3 illustrates a typical screen shot of a window 300 for rating the usefulness of the thread within a discussion group in accordance with some embodiments of the present invention. The window 300 may be from a web browser application program, such as INTERNET EXPLORE, manufactured by Microsoft Corporation of Redmond, Wash. Although the present invention is described as being used with a web browser application program, those skilled in the art will appreciate that any program, which allows a user to access a discussion group over a distributed network 210 may be used without departing from the scope of the invention. The window 300 in the web browser application program typically resides on the client 205 of the client-server system 200. The window 300 contains a Title Bar 305, which typically displays the software application and the name of the file current running in window 300. The title bar 305 may also contain a minimize button, a maximize button, and a close button, which are well known in the art. The window 300 may also contain a command bar 310, which typically contains a number of commands such as FILE, EDIT, VIEW, FAVORITES, TOOLS, and HELP. Those skilled in the art will appreciate that any number of commands may be placed in the command bar 305 in accordance with the application program running in window 300 without departing from the scope of the invention. The window 300 may also contain one or more toolbars 310, which may contain any number of commands, such as a BACK button, a FORWARD button, a DELETE button, a REFRESH button, and a HOME button. The number of buttons displayed in the toolbar 310 in the illustration are only a representation of the types of command buttons that may be displayed in the toolbar 310. Those skilled in the art will appreciate that other buttons that perform a variety of functions may be included in the command bars without departing from the scope of the invention.

The window 300 may also contain a display area 330 for displaying information regarding the discussion group. The display area 330 may be divided into several regions to organize the information regarding the discussion group. For example, the display area 330 may contain a first region 332, which may display a hierarchical organization of the available discussion groups hosed by the TD server 225. For instance, in the figure, the following discussion categories are shown: Games, MapPort, Mobile Device, Money, MSN, .Net Development, and Office. Within each category, there may be sub categories, or discussion groups. For example, the Office category may have an Access sub-category, an Excel sub-category, a Word sub-category and, and so forth. Similarly, under each sub-category, there may be an additional level of sub-categories or discussion groups. There is no limit to the number of levels of sub-categories that may be contained within each category. AT the bottom of each category or sub-category is a list of discussion groups. For instance, under the Excel sub-category there is a General Questions discussion group. A visual indicator 338, such as a bracket, shading, reverse video, or any other visual indicator, may be displayed around the discussion group topic when the cursor is placed proximate to a topic to provide visual feedback to the user.

When a desired discussion group is highlighted in the first region 332, the discussion group topTD for that discussion group may be displayed in a second region 334 of the display area 330. The second region 332 may contain the name of the discussion group topic as well as each thread under the discussion group topic. In addition to the second region may also contain a field 337 that indicates how many posts are listed within each thread, as well as a ratings field 338 that shows then number of posts that have been identified as helpful.

Figure 5:
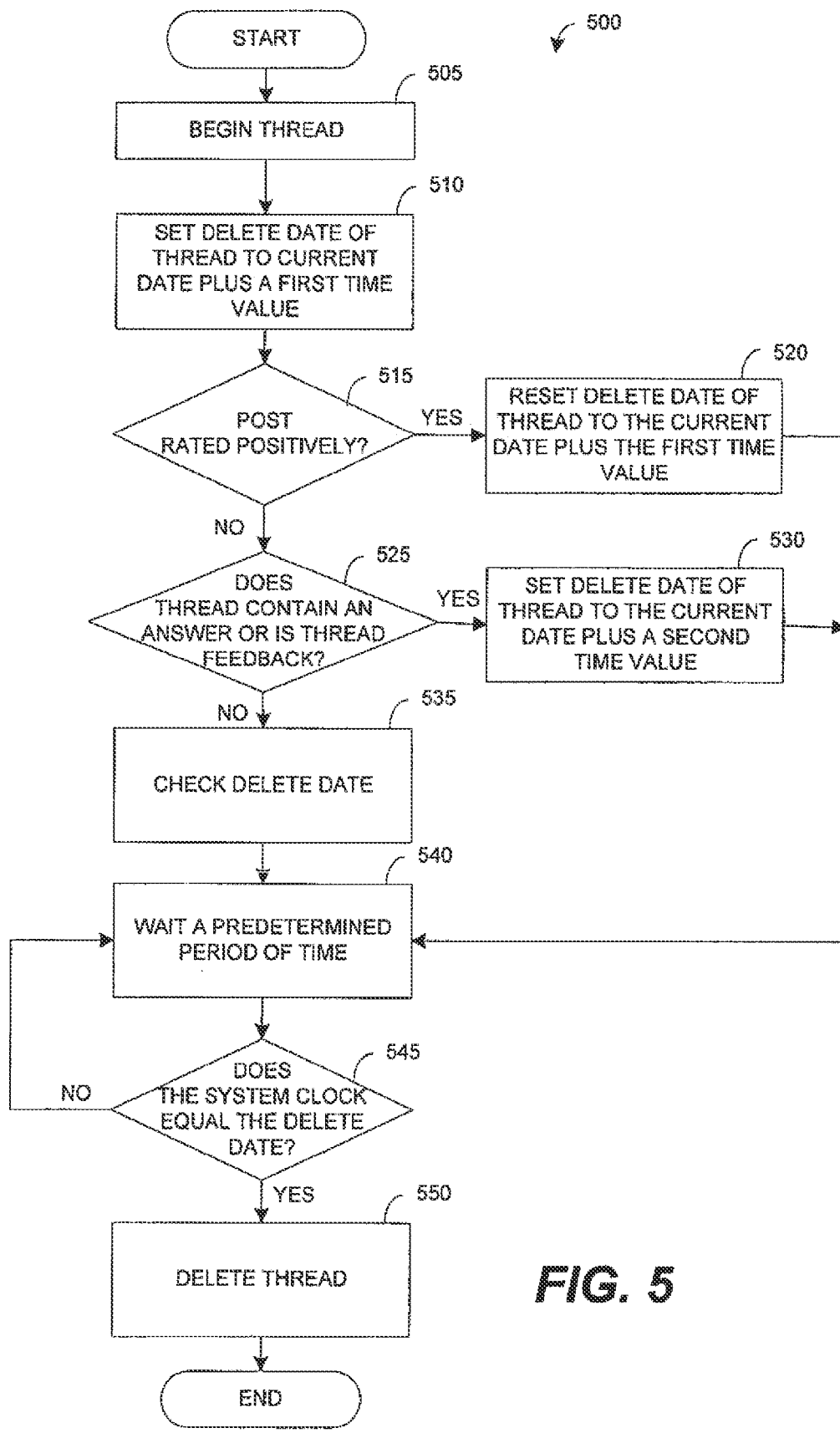
FIG. 5 is a logic flow diagram illustrating a routine for removing threads from a discussion group based on how important the thread is rated by the users of the discussion group in accordance with some embodiments of the present invention.

The user may expand the threads by using the pointing device 161 to select an expansion icon 339 located proximate to the desired thread. Additionally, the thread may be selected by placing the pointing device 161 proximate to the desired thread. The expansion icons are well-known in the computing field and therefore will not be discussed in detail. Once the desired thread is selected, a listing of the individual posts along with the users who entered them is displayed proximate to the thread title. For example, as shown in FIG. 5, the listing of posts is displayed immediately below the discussion topic thread. In addition to the name of the user who entered a post, the date that the post was entered may also be displayed.

Each thread displayed in the second region 334 has an indicator 360 proximate to the thread to indicate what types of posts are associated with the thread. For example, the one type of indicator may be a question mark to indicate that the post is a Question-type post. Similarly, the indicator 360 may be a call out box to indicate that the post is a Suggestion to the operator of the discussion group. Similarly, if the thread contains a reply to a question of a suggestion, then the indicator may be a question mark with check mark, or a call-out box with a check mark, respectively. Normally, the indicator 360 proximate to each thread will illustrate the nature of the thread. The indicator 360 also provides the user with a visual feedback as to what threads may be important. Similarly, if a post that has been listed for long period of time does not have any replies, the user may assume that the thread is not very useful. Just as each thread will have an indicator 360 associated with it, each post within the thread may also have a similar indicator 365 associated with it once the view of the thread is expanded by selecting the expansion icon 339. Although the indicator 360 and 365 have been described as being either question mark, a call-out box, or a combination of a question mark and a check mark or a call-out box and a check mark, those skilled in the art will appreciate that the indicators 360 and 365 may be any shape that conveys to the user the type of post listed within the thread to the without departing from the scope of the invention.

To select a post, the user may place the cursor over the individual post using the pointing device 161 and "click" on the post. When the user clicks on the individual post, the text of the post is displayed in a third region 336 of the display area 330. In addition to the text of the individual post, addition information, such as the subject of the post, the date that the post was created, the name of the person who created the post and the like may also be displayed within the third region 336. Furthermore, a ratings window 392 may also be displayed within the third region, which is used to elicit feedback from the user. The ratings window 392 contains a text message, which may ask the user "Was this post helpful to you?" Additionally, the ratings window may have a "YES" button 394 and a "NO" button 396 for the user to select for a response. If the user selects the "YES" button, then a positive response is recorded in the ratings field associated with the post. Alternatively, if the user selects a post to read but does not affirmatively select either the "YES" button 394 or the "NO" button 396 in the ratings window 392, the non-response may be treated as an affirmative answer. Therefore, non responses are treated as if the user had selected the "YES" button. Conversely, If the user selects the "NO" button 396, then a negative response is recorded in the ratings field of the particular post. Additionally, the passport ID of the user is also recorded along with his or her response and stored in the TD database 230. This allows the response to be associated with a user and insures that the each user only votes one time for each post. Although the display area 330 of the window has been described as having a configuration with three regions, those skilled in the art will appreciate that other window configurations may be used without departing from the scope of the invention.

Figure 4:
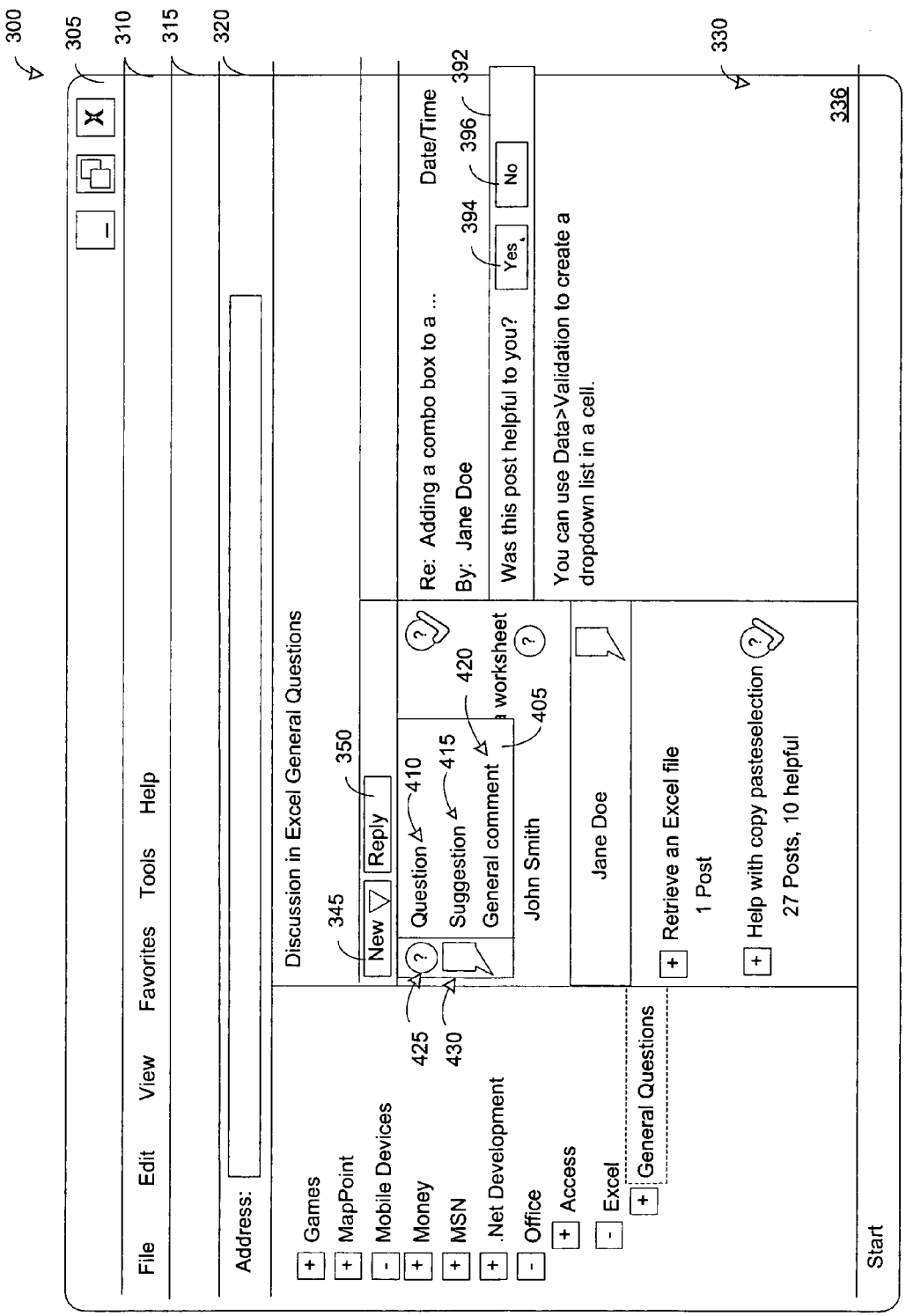
FIG. 4 is an illustration of a screen shot illustrating a method for adding additional posts to a thread in accordance with some embodiments of the present invention.

FIG. 4 is an illustration depicting a screen shot of the window 300 illustrating how a user may create a new post within a given thread in accordance with some embodiments of the present invention. A menu bar 340 for generating new post is located proximate to the second region 334 of the display area 330. For example, the menu bar 340 is located directly above the second region 334. Those skilled in the art will appreciate that the menu bar 340 may be located anywhere within the window 300 without departing from the scope of the invention. When a user selects either the "NEW" button 345 or the "Reply" button 350, a drop-down window 405 appears proximate to the menu bar 340. If the user selects the "NEW" button 345, the drop-down window 405 will display several menu items that represent the available types of posts. For example, the drop-down menu 405 may contain a Question menu item 410 that represent a Question-type post 410. If the user select the Question menu item 410 a new Question thread will be started in the selected discussion. The drop-down menu 405 may also contain a Suggestion menu item 415 that represent a Suggestion-type post 420. If the user selects the Suggestion menu item 415, a Suggestion post will be created in the selected discussion thread. The drop-down menu 405 may also have a General Comment menu item 430 that represent a General Comment-type post. If the user selects the General Comment menu item 430 then a new General Comment thread will be added to the selected discussion. Although the drop-down menu item has been described as only having a Question menu item 410, a Suggestion menu item, and a General Comment menu item 430, those skilled in the art will appreciate that any number of menu items may be added to the drop-down menu 405 without departing from the scope of the invention. Also, as new post types are created for discussion threads, they may be easily added to the drop-down menu 405. Finally, once the user has selected the desired type of post her or she would like to create, a cursor will appear in the third region 336 of the display area 330 to allow the user to enter the text of the post. Once the user is finished typing in the text message, the post will appear in under the appropriate discussion in the second region 334 of the display area 330.

In addition to the menu items the drop-down menu 405 may also contain several identifying indicia associated with one or more of the menu items. For example a question mark 425 may be associated with the Question-type post 410, or a call-out balloon 430 associated with the Suggestion type menu item 415. The indicia provide the user with a visual feedback, and are used to identify to the user the type of post contained in the threads as displayed in the second region 334 of the display area 330. At the drop-down menu 405, the user may select any of the menu items. Additionally, the menu bar 340 may also display identifying indicia associated with one or more of the thread types, such as a question mark 425 associated with the Question menu item 410, or a call-out balloon 430 associated with the Suggestion-type menu item. Although method for allowing a user to rate a post is described as being presented in drop-down menu 405, those skilled in the art will appreciate that other methods, such a placing the ratings on the menu bar, in a field displayed within the text of the post, or the like, may be used to allow the user to rate the post without departing from the scope of the invention. The important feature is that the rating mechanism is clearly associated with the appropriate post so that the user is aware of the association.

FIG. 5 is logic flow diagram illustrating a routine 500, in which discussion threads may be removed from a TD server 225 based on how users rate the usefulness, or importance of the thread, rather than the age of the thread. The routine 500 may be stored on the TD server 205 and implemented in a browser application program on the client. Routine 500 begins at 505, in which the thread is started by a user on a discussion board within a discussion group. The thread is begun when the user submits a post. A post menu bar 340 is displayed in the web browser window 330 and may contain a "NEW" button 345 and a REPLY button 350. If the user selects the "NEW" button 345, a drop down menu 405 may appear to display the types of posts that the user may select from. Typically, the drop down menu 405 will contain a Question menu item 410, a Suggestion menu item 415, and a General Comment menu item 420. Additionally, the post menu bar 340 may also display identifying indicia associated with one or more of the menu items, such as a question mark 425 associated with the Question menu item 410, or a call-out balloon 430 associated with the Suggestion item 415. The user may then simply select a menu item to begin entering a post by simply dragging the cursor over the desired choice in the drop-down menu 405 and selecting the appropriate menu item using standard windowing techniques. Once the user has selected the desired type of post, a cursor will appear in the third portion 336 of the display area 330 to allow the user to compose the text message. The third portion 336 of the display area 330 may be preloaded with the name of the user creating the post as well as the subject of the post, if the user selected the REPLY button 350. However, if the post is the beginning of a new thread, then the user will typically be required to supply the subject of the post. In addition to the text of the post, additional information is added to the post, which includes the name of the discussion group, the subject line of the post, the email address of the poster, the date that the post was created, and the passport ID of the user.

At 510, the delete date of the post is set and stored with the post in the TD database 230. The delete date is selected as the date that the post is created plus a first predefined number of days, T1. For example, for most threads the predefined number of days, T1 is typically 90 days. Thus, the delete date will be set 90 days from the date the thread was created. However, there are some types of threads that may be more important than other threads and therefore a second predefined number of days, T2, which is greater than T1, may be added to the creation date of the thread to form the delete date. For instance, Question/Answer threads that contain at least one Answer post may be consider to be more important General Comment threads and the Question thread should be retained for a greater period of time. Therefore, T2 may be set at 180 days. Thus, the delete date of the Question/Answer thread is determined by adding the second predefined number of day, T2, to the system date when the thread was created. Although T1 is described as being set to 90 day, and the second predefined number of days, T2, is described as being set to 180 days, those skilled in the art will appreciate that the values for T1 and T2 may be set to any number of days as the administrator of the TD server 225 sees fit in light of the number of threads and the number of messages being posted to the discussion group. However, the value of T2, which is associated with the more important threads, such as Questions/Answer and Feedback-type threads, should be greater than the value of T1, which is associated with the remaining thread types to insure that the Question and Feedback type threads are retained longer on the TD server 225.

Once the delete date has been determined, routine 500 remains idle until the determination is made that a user positively rates a post within the thread as 515, in which the determination is made whether any post in the thread has been rated positively by another user. If the post is rated positively, then the "YES" branch of routine 500 is followed to 520, where the delete date is reset to the current date of the system clock plus the appropriate time period, T1 or T2, depending on whether the post is a Reply or General Comment type or whether the post is a Question/Answer or Feedback type, respectively. Once the delete date has been reset, the routine proceeds to 540, in which a predetermined period of time elapses before the routine determines whether the delete date equals the system clock date. Typically, the routine will examine the threads at a predefined period of time, such each day, every thirty (30) days, and the like. This ensures that unwanted threads are removed from the TD server 225 in a timely manner. Those skilled in the art will appreciate that the predefined amount of time that the TD server 225 examine the delete dates may be any number of days and is not limited to 30 days, as described above. Once the predefined number of days has passed, the determination is made at 545 whether the system clock of the TD server 225 is equal to or greater than the delete date of a particular thread. If the date of the system clock is equal to or greater than the deleted date, then the "YES" branch is followed to 550 where the entire thread is deleted. If however, the date of the system clock is less than the delete date of the thread, then the "NO" branch is followed back to 540 where the TD server 225 waits for another predetermined time period before proceeding to 545 to again check the threads in the TD database 230 to determine whether any of the threads should be deleted. The process of checking the post to determine whether any of them should be deleted is continually repeated.

Returning to 515, if the post has not been rated positively, then the "NO" branch is followed to 525, in which the determination is made whether a post within the thread has been marked as being an answered by the creator of the post. The creator of the original post has the option to review the replies and if the he or she believes that one of the replies provides an answer to the post then he or she may mark the post as being answered. Marking a post as being answered automatically converts the thread to a Question/Answe type thread, which automatically elevates the post to a more important status and insures that the thread will be maintained on the TD server 225 for a loner period of time. In this instance, the "YES" branch is followed to 530 where the delete date is reset to the current date of the system clock plus the second predefined time interval, T2. Once the delete date of the thread is reset, the routine proceeds to 540, where the routine 500 waits a predetermined period of time. At 545 whether the system clock of the TD server 225 is equal to or greater than the delete date of a particular thread. If the date of the system clock is equal to or greater than the deleted date, then the "YES" branch is followed to 550 where the entire thread is deleted. If however, the date of the system clock is less than the delete date of the thread, then the "NO" branch is followed back to 540 where the TD server 225 waits for another predetermined time period before proceeding to 545 to again check the posts in the TD database 230 to determine whether any of the threads should be deleted. However if the determination is made at 525 that the thread does not contain an Answer to a Question, then the "NO" branch is followed to 540, where the process of determining whether the thread should be deleted begins.

Other alternative embodiments will become apparent to those skilled in the art to which an exemplary embodiment pertains without departing from its spirit and scope. Accordingly, the scope of the present invention is defined by the appended claims rather than the foregoing description.

We claim:

1. A method for deleting threads from a discussion group comprising a plurality of posts, the method comprising:
    determining whether at least one user has read at least one post within a thread;
    providing a message to the at least one user inquiring whether the at least one post was useful to the at least one user, wherein providing the message to the at least one user comprises providing, to the at least one user, a first selection operative to indicate, upon selection, a positive response, and a second selection operative to indicate, upon selection, a negative response;
    determining whether the at least one user has rated the at least one post within the thread as useful;
    if the at least one user has rated the at least one post as useful, retaining the thread;
    if the at least one user has read the at least one post and not rated the at least one post, retaining the thread;
    if the at least one user has rated the at least one post as not useful, deleting the thread; and
    setting a delete date associated with the thread to a predetermined value wherein setting the delete date to the predetermined value comprises:
        determining a type of the thread;
        if the thread is a first type then setting the delete date of the thread to a first predefined value; and
        if the thread is a second type then setting the delete date of the thread to a second predefined value, wherein the first predefined value is less than the second predefined value.

2. The method of claim 1, wherein retaining the thread comprises resetting the delete date of the thread to the predetermined value.

3. The method of claim 2, wherein retaining the thread comprises leaving the delete date of the post unchanged.

4. The method of claim 2, wherein deleting the thread comprises:
    determining whether the delete date of the at least one post is equal to a current date; and
    deleting the thread if the delete date is equal to the current date.

5. The method of claim 1, wherein determining whether the at least one user has rated the at least one post within the thread, comprises:
    storing a rating value in a field associated with the at least one post; and
    determining whether the at least one user has affirmatively rated the at least one post as positive.

6. The method of claim 5, further comprising determining whether the rating field has a value indicative of the positive response, wherein determining whether the rating field has the value indicative of the positive response comprises:
    determining whether the at least one user opened the at least one post; and
    storing a positive value in the rating field associated with the at least one post.

7. The method of claim 6, wherein determining whether the rating field has the value indicative of the positive response further comprises:
    determining whether the at least one user provided the positive response in response to the message inquiry whether the at least one post was useful.

8. The method of claim 1, wherein the first type of thread comprises at least one of Question/Answer-type threads and Feedback-type threads.

9. The method of claim 1, wherein the second type of thread comprises a General Comment-type post.

10. The method of claim 1, further comprising:
displaying each post and a rating for each post on a display device.

11. A computer-readable storage device having computer-executable instructions which when executed perform a method for deleting threads from a discussion group comprising a plurality of posts, the method executed by the computer-executable instructions comprising:
setting a delete date associated with the thread to a predetermined value wherein setting the delete date associated with the thread to the predetermined value comprises;
determining a type of the at least one post,
if the at least one post is a first type, setting the delete date to a first predetermined value, and
if the at least one post is a second type, setting the delete date to a second predetermined value;
determining whether at least one user has read at least one post within the thread;
providing a message to the at least one user inquiring the at least one user for a rating of the at least one post, wherein providing the message to the at least one user comprises providing, to the at least one user, a first selection operative to indicate, upon selection, the at least one user's positive feedback, and a second selection operative to indicate, upon selection, the at least one user's negative feedback;
updating the delete date of the thread if at least one post is rated positively by at least one user;
extending the delete date if the at least one user has read the at least one post and not rated the at least one post; and
determining whether the delete date of the thread is equal to a current date; and
if the delete date is equal to the current date, deleting the thread from the discussion group.

12. The computer-readable storage device of claim 11, further comprising determining whether the at least one post has received a positive rating, and updating the delete date of the thread if the at least one post received the positive rating.

13. The computer-readable storage device of claim 11, wherein the first type of post is selected from a list comprising Question type posts and Feedback type posts and the second type of post comprises a General Comment-type post.

14. A system for removing a thread comprising a plurality of posts from a discussion group comprising a plurality of posts, the system comprising:
a server operable to:
receive an input from a client related to at least one post associated with the thread;
return at least one post of the thread to the client;
determine whether the client opened the at least one post of the thread;
update a delete date of the thread if the client opened the at least one post of the thread;
inquire the client for a rating of the at least one post of the thread, wherein the server being operable to inquire the client for the rating of the at least one post of the thread comprises the server being operable to provide a message inquiring the client for the rating of the at least one post of the thread displayed proximate to the at least on post, the message comprising a first selection which, upon selection, is operative to indicate a positive rating from the client, and a second selection which, upon selection, is operative to indicate a negative rating from the client;
receive one of: the first selection and the second selection indicative of at least one rating associated with the at least one post from the client;
assign the positive rating to the at least one rating associated with the at least one post when neither one of the first selection and the second selection is received from the client; and
determine whether to delete the thread associated with the at least one post from a database depending on the at least one rating received from the client;
determine whether the input received from the client has a value indicative of being useful; and
update the delete date of the thread if the input received from the client had the value indicative of being useful wherein the server being operable to update the delete date of the thread comprises the server being operable to;
determine a type of the thread,
set the delete date to a first predetermined value if the thread is a General Comment-type thread,
set the delete date to a second predetermined value if the thread comprises a Question/Answer-type thread, and
set the delete date to a third predetermined value if the thread comprises a Feedback-type post, wherein the second predefined value is less than the first predefined value; and
a distributed network connecting the client to the server.

15. The system of claim 14, wherein the server being operable to determine whether to delete the thread comprises the server being operable to:
determine whether the delete date of the thread is equal to a current date; and
if the delete date is equal to the current date, delete the thread.

16. The system of claim 14, wherein the server is further operable to store the received input from the client in a rating field associated with the at least one post and the delete date associated with the thread.

* * * * *